May 8, 1956 P. W. GARBO Re. 24,148

MANUFACTURE OF SYNTHESIS GAS

Original Filed Oct. 2, 1946

INVENTOR.
PAUL W. GARBO

BY Daniel S. Cryker

ATTORNEY

United States Patent Office

Re. 24,148
Reissued May 8, 1956

24,148

MANUFACTURE OF SYNTHESIS GAS

Paul W. Garbo, Freeport, N. Y., assignor to Hydrocarbon Research, Inc., New York, N. Y., a corporation of New Jersey Original No. 2,526,652, dated October 24, 1950, Serial No. 700,819, October 2, 1946. Application for reissue September 5, 1951, Serial No. 245,120

13 Claims. (Cl. 48—196)

Figures 1, 2, 3, 4, 5:
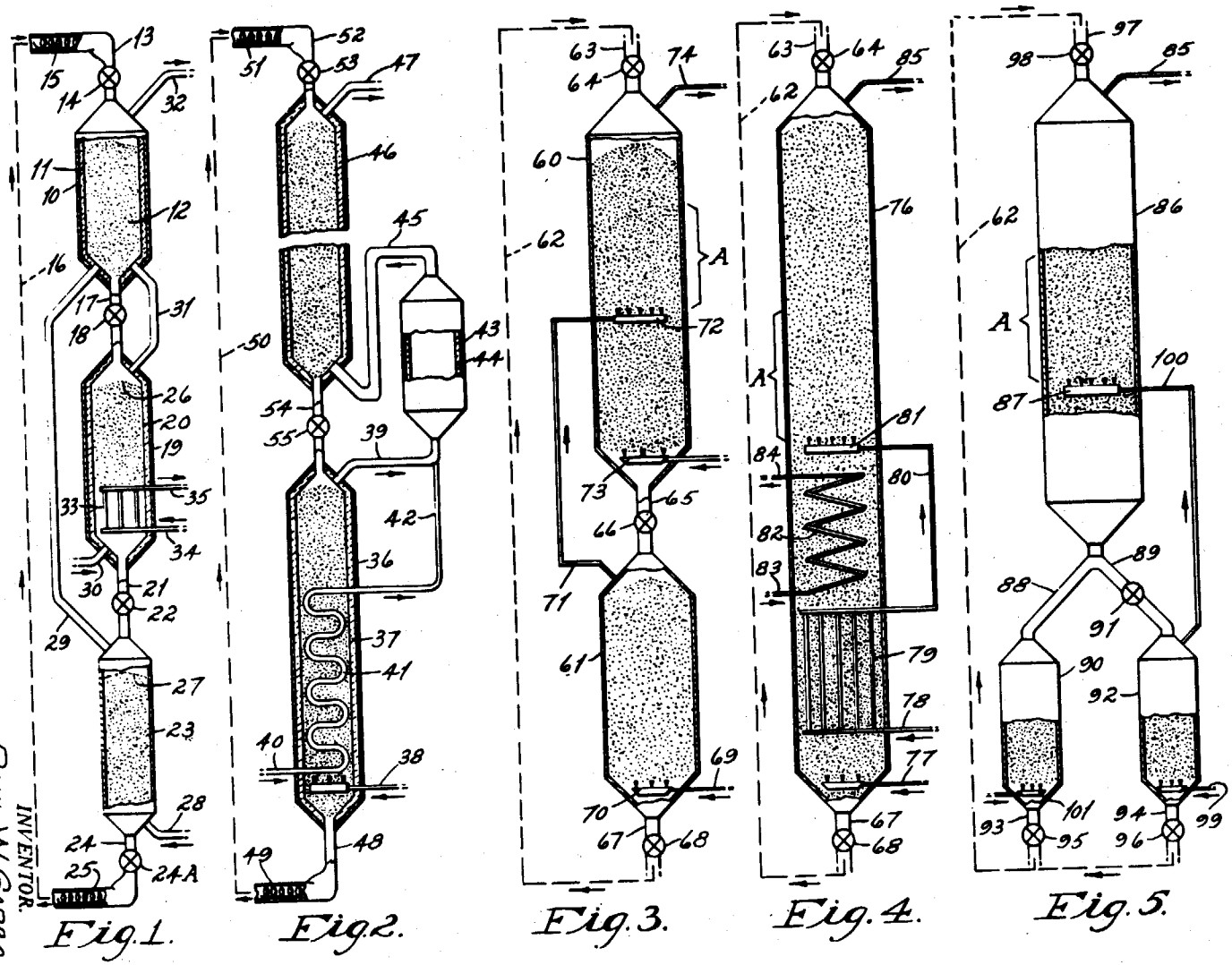

Matter enclosed in heavy brackets [ ] appears in the original patent but forms no part of this reissue specification; matter printed in italics indicates the additions made by reissue.

The present invention relates to high temperature exothermic reactions and is more particularly concerned with the interaction of a hydrocarbon and an oxygen-containing reactant with partial combustion for production of mixtures comprising essentially hydrogen and carbon monoxide known in the art as synthesis gas.

While the invention, for purposes of convenience in illustration, will be described more particularly in connection with the preparation of synthesis gas from hydrocarbons, nevertheless it will be understood that the principles thereof are equally applicable to equivalent exothermic processes, particularly where relatively high temperatures are desirably maintained in the reaction zone.

In the co-pending application Serial No. 700,019, filed September 28, 1946 in the name of Percival C. Keith, *which matured as U. S. Patent No. 2,642,346 on June 16, 1953*, there is disclosed a process and apparatus for the preparation of synthesis gas in the presence of a granular heat absorptive material (hereinafter referred to as a thermophore) which absorbs the heat of reaction in the zone of heat liberation and is later passed countercurrently to incoming feed gases in order to transfer its sensible heat to the feed gases. Operating in this manner, it is possible to supply reactants to the reaction zone at such a temperature that relatively high reaction temperatures of 2000° F., or materially thereabove, can be maintained. In accordance with that disclosure, the granular heat absorbing material may be inert or may comprise or include a catalyst for the reaction in question, and it is disclosed that split streams of the heated solid may be employed to preheat the respective reactant gases individually. By this means, intermixing of the reactants is avoided in advance of the combustion zone, and the serious problems of preheating explosive mixtures are obviated.

This method of operation has the disadvantage that hydrocarbon feeds, preheated to high temperatures, are subject to thermal decomposition with the production of undesirable by-products, including carbonaceous material which tends to deposit upon and foul the thermophore. On the other hand, the aforesaid application contemplates overcoming this difficulty by recirculating the thermophore through the system in such a manner that random portions thereof are continuously being diverted to the oxygen preheating zone, wherein carbon is removed by combustion. This, however, tends to introduce variable quantities of carbon dioxide into the gas generation zone and may, under some circumstances, result in an unfavorable heat distribution with excessive heat energy being liberated in the preheating of oxygen.

It is an object of the present invention to overcome the disadvantages of the foregoing procedure by providing a process wherein the preheating of the hydrocarbon feed is restricted to a temperature range within which decomposition is substantially avoided while supplying the heat energy to the incoming stream of oxygen or oxygen-containing reactant at a higher temperature level approaching that of the exothermic reaction zone.

A further object of the present invention contemplates the initial passage of relatively stable reactant gases in heat exchange relation with the hot thermophore prior to preheating a less stable reactant feed, whereby the thermophore reaches the less stable reactant at a controlled temperature such that thermal decomposition is avoided. Other and further objectives will be apparent from a consideration of the following disclosure.

In order to more specifically illustrate the invention, reference is had to the figures of the drawing, wherein Figure 1 represents more or less diagrammatically one combination of apparatus suitable for carrying out the present process; Figure 2 illustrates a preferred combination of apparatus; and Figures 3, 4 and 5 respectively disclose, only schematically, other suitable embodiments of the invention.

In Figure 1, the reference numeral 10 indicates a combustion or reaction vessel provided with an internal refractory lining 11 and containing a body of granular heat absorbing material 12. The granular contents are supplied through standpipe 13 by means of any suitable mechanical feeding device such as star feeder 14 operated at a predetermined rate. The star feeder 14 and standpipe 13 continuously receive a supply of the heat absorbing particles through the agency of a worm conveyor 15, which in turn is supplied from an elevator 16 indicated only in dotted lines.

The thermophore is continuously discharged from the bottom of the reaction chamber 10 through outlet standpipe 17 controlled by star feeder 18 operating in coordination with the star feeder 14. Standpipe 17 discharges directly into preheating chamber or zone 19, similarly advantageously provided with a refractory lining 20. A further standpipe 21, connecting with the bottom of the preheating chamber 19 and controlled by a third star feeder 22, discharges directly into a second preheating chamber 23, which in most embodiments of the present invention need not be provided with a refractory lining. The second or lower preheating chamber 23 similarly discharges into standpipe 24 leading by way of feeder 24A to screw conveyor 25 which supplies the aforementioned elevator 16.

With the foregoing combination of feeding and conveying instrumentalities, therefore, the granular thermophore may be passed in a continuous cycle from the lower portion of the second preheating chamber through the elevator to the gas reaction chamber and thence successively through the reaction or combustion zone and the two preheating zones. Under properly coordinated conditions of operation, it will be apparent that the thermophore level can be maintained substantially constant in each of the three chambers, as, for example, at the level indicated by the reference numeral 26 in chamber 19 and by the reference numeral 27 in chamber 23.

During the progress of such cycle a hydrocarbon gas, such as methane, from any suitable source not shown, is introduced through inlet pipe 28 to the bottom of preheating chamber 23 and passes upwardly in countercurrent relation to the downcoming thermophore, emerging from its upper surface 27 and flowing by way of outlet pipe 29 to the lower portion of the combustion chamber 10. At the same time, oxygen, for example, is introduced from any suitable source, not shown, by way of inlet pipe 30 and similarly moves in countercurrent relation to the thermophore in the preheating chamber 19, collecting in the upper portion thereof above thermophore level 26 and passing by way of pipe 31 to the lower portion of the reaction zone 10. The reaction products evolved are conducted out through pipe 32 for further use, as for example to a system operating for the synthesis of hydrocarbons.

In operation, therefore, methane and oxygen, for example, mix and react in the chamber 10 heating its content of heat absorbing granules to the desired reaction temperature. Hot thermophore discharged from the reaction zone gravitates into the vessel 19 at substantially reaction temperature and is progressively cooled to any desired degree by the countercurrent passage of incoming oxygen. Accordingly, the thermophore leaving the chamber 19 and entering chamber 23 is at a substantially lower temperature level depending upon the quantity of sensible heat energy abstracted by the passage of oxygen. The thermophore is further cooled to any desired lower level by the countercurrent passage of the methane in the lower chamber 23.

Following this method of operation it is obviously possible to preheat the oxygen stream to any desired temperature approximating the reaction temperature, while at the same time lowering the temperature of the thermophore supplied to the second preheating zone to a level favorable for preheating the second reactant without adverse thermal effects. In short, the invention provides an arrangement whereby a reactant gas, which has substantial or complete thermal stability, is used to abstract sensible heat from the thermophore in advance of preheating a relatively thermally unstable reactant to a predetermined lower temperature for supply to a reaction zone.

Where excess heat energy is available in the system, a heat exchanger 33 may be inserted in any one or more of the three chambers shown. The heat exchanger 33 may take any conventional form, preferably a series of vertically extending tubes joining with headers so configurated as to permit free gravitation of solid particles therealong. Inlet pipe 34 and outlet pipe 35 permit circulation of any suitable heat transfer medium such as water, Dowtherm or mercury, and the device may be operated where desired to generate steam for the operation of the mechanical conveying means or for other purposes. Where the high temperature reaction is insufficiently exothermic to compensate for heat losses from the system, exchanger 33 may be operated to supply heat in amount to balance the losses.

Any conventional means may be employed for assuring the introduction of the preheated feed gases into the reaction zone in good admixture. Thus, pipes 29 and 31 advantageously discharge into the reactor in opposed relationship. Alternatively, however, the two streams of gas may be introduced through any conventional type of mixing nozzle so that they reach the interior of the zone in condition for immediate reaction. The reaction products pass upwardly through the thermophore in countercurrent heat exchange relationship and are carried off through outlet conduit 32 for use or disposition as required.

From the foregoing, it will be apparent that the present invention is particularly advantageous in the manufacture of synthesis gas for the production of hydrocarbons and oxygenated hydrocarbons by the catalytic reduction of carbon monoxide by hydrogen. Thus, with a reactant feed approximating 1 mol of oxygen for each 2 mols of methane, for example, and a temperature of 2100° F. and upwardly in the reaction chamber 10, the reaction gases will consist essentially of hydrogen and carbon monoxide in the molar ratio of about 2:1. With proper control of temperatures and proportions of reactant feed and by the use of substantially pure oxygen, the reaction product, freed of reaction water, may contain as much as 85% or more of the two desired gases, the remainder being essentially nitrogen, carbon dioxide and methane.

In accordance with one specific example of the process, a stream of circulating thermophore, in a system analogous to that described in connection with Figure 1, passes through a reaction zone in which the thermophore is heated to a temperature of about 2300° F. The thermophore comprises particles of carborundum of about 1/16 inch in diameter. The thermophore stream withdrawn from the reactor is passed countercurrent to an incoming stream of oxygen of about 98% purity, having an initial temperature of about atmospheric and being discharged at a final temperature of 2200° F.

The oxygen is introduced at the rate of approximately 2880 cubic feet per hour. The thermophore, cooled to about 900° F. by contact with the oxygen stream, is withdrawn and in a further zone passed in countercurrent relationship to a stream of natural gas introduced at atmospheric temperature and discharged at about 800° F. The natural gas stream comprising about 75% methane, 13% higher hydrocarbons and 10% hydrogen, is introduced at the rate of about 3900 cubic feet per hour. The respective streams of natural gas and oxygen are admixed in the reactor and proceed to react at the foregoing reactor temperature with the production of a gas containing, after removal of water of reaction, about 2% nitrogen, about 2% methane, and about 5% carbon dioxide, the remainder being hydrogen and carbon monoxide in the molar ratio of 2:1. The rate of thermophore circulation is readily adjusted to maintain the foregoing temperatures in the respective zones. Thus, when operating as above, the thermophore is discharged from the lower preheating zone to the elevator at a temperature of about 200° F. and returned to the reaction zone.

It is important to point out that the present invention is not limited to operation with a packed generator, but, as is indicated in Figure 2, may function with a generator having an open gas generation chamber provided the sensible heat from the products of combustion is transferred to the circulating thermophore. Referring more specifically to this figure, the gaseous reactants are preheated in a chamber 36 provided with a refractory lining 37, through which the thermophore continuously gravitates as before. The oxygen stream, for example, introduced by way of inlet pipe 38 passes upwardly in countercurrent relationship through the hot thermophore, and is withdrawn to the lower portion of the generator 43 by pipe 39. In the present embodiment, the hydrocarbon gas is supplied by way of inlet pipe 40 through a heat exchange coil 41 disposed within the downflowing mass of thermphore. In short, the methane in this embodiment passes in indirect countercurrent heat exchange relationship with the thermophore and at the predetermined temperature of preheat is discharged through outlet pipe 42 to the generator 43.

In this instance, the generator 43 comprises a chamber having a refractory lining 44 and an upper outlet conduit 45. It is advantageously free from granular packing of any kind, so that the gases react in an open, unpacked space. More specifically, in order to inhibit production of free carbon, I prefer to maintain the ratio of internal generator surface [,] to generator volume at as low a value as possible, *i. e., as low as is practicable from an engineering viewpoint. Advantageously, the ratio of internal surface to volume in the generator or reaction zone is less than 1, the surface area and volume being computed in terms of feet as the linear unit of of measurement. As illustrated by the generally cylindrical generator 43 of Figure 2, the proper configuration of the generator is one which avoids extensive or excessive surface, i. e., the generator for any given volume is chosen to have a low ratio of internal surface to volume.*

Reaction products, essentially hydrogen and carbon monoxide, pass by way way of conduit 45 into the lower portion of a heat transfer chamber or accumulator 46, wherein they pass upwardly in countercurrent relationship with the content of granular thermophore, heating it to a temperature closely approximating reaction temperature in the vicinity of the discharge standpipe 54.

The final gases, having transferred a large portion of their sensible heat content to the thermophore, are discharged through pipe 47 for further use.

The circulation of thermophore may be accomplished substantially in the same manner as the previous embodiments by means of a standpipe 48 receiving thermophore from the bottom of the preheating chamber 36, a screw conveyor 49 supplying an elevator represented only by the dotted line 50, and a receiving screw conveyor 51 at the top of the elevator. The screw conveyor 51 continuously supplies thermophore to a standpipe 52 controlled by star feeder 53 and supplying the accumulator chamber 46. The solid granules pass out of the accumulator by way of standpipe 54 controlled by star feeder 55 and are received in the lower or preheating chamber 36. As before, the mechanical means are so operated as to maintain the indicated levels of granular thermophore in the respective chambers.

In the operation of this device, it will be apparent that the preheated oxygen reaches the generator at approximately reaction temperature, whereas the hydrocarbon gas is supplied at a somewhat lower temperature favorable, in the aggregate, to a good overall heat energy utilization.

Referring to Figure 3, there is indicated schematically a further modified embodiment of the invention, wherein the thermophore circulates continuously thru a closed cyclic path including two vertically disposed chambers or vessels 60 and 61 and an elevator system represented by the dotted line 62. The upper vessel 60 is fed with thermophore at its upper end, thru inlet standpipe 63, controlled by star feeder 64. Standpipe 65 and star feeder 66 convey the thermophore from vessel 60 to vessel 61, and the lower standpipe 67 and feeder 68 discharge into the elevator for return to the vessel 60.

The relatively heat unstable reactant, as for example methane, is passed into the lower portion of vessel 61 thru inlet pipe 69 and distributing head 70, passing upwardly in direct countercurrent exchange with the thermophore, and leaving vessel 61 via pipe 71, in the preheated condition. Pipe 71 feeds the preheated reactant into vessel 60 via distributing head 72 spaced vertically above the lower extremity thereof.

The relatively heat stable reactant, as for example oxygen, is preheated in the portion of vessel 60 below the distributor 72 by introducing it thru inlet 73. Products of reaction are withdrawn thru outlet pipe 74.

In this embodiment the two reactants meet, intermingle and react in a section of the vessel just above the inlet 72, indicated approximately by the bracket A. Above this reaction zone the fluid products of reaction rise in direct countercurrent contact with the downcoming thermophore and are cooled while heating the thermophore to the region of reaction temperature. Accordingly, the thermophore is successively heated by reaction products, passed thru the reaction zone, and thereafter passed first, in direct heat exchange relation with the incoming, relatively heat stable reactant and thereafter, with the relatively heat unstable reactant.

In the embodiment of Figure 4 a single vessel 76 is continuously supplied with a downwardly gravitating mass of thermophore circulated via the elevator 62 and feeders 64 and 68. The relatively heat stable reactant is introduced at a low point in the vessel thru inlet 77, whereas the heat unstable reactant passes thru inlet 78 and indirect heat exchanger 79. The heat exchanger 79 may take any conventional form, as for example, a series of tubes joined by headers past which the thermophore is free to gravitate. The hot thermophore passing the tubes indirectly heats the internal stream of reactant which is withdrawn thru outlet 80 and returned to the interior of the vessel 76 via distributing head 81.

It is to be noted that the inlet 81 is disposed a substantial distance above the heat exchanger 79 so that the other reactant traverses a substantial path where it initially contacts the downcoming hot thermophore and is heated to a higher temperature level than the relatively heat unstable reactant, while cooling the thermophore to reduce it to an appropriately lower temperature level.

This preheating space may be occupied by a second heat exchanger 82 supplied with a suitable heat transfer fluid via inlet 83 and outlet 84. By this means heat energy may be added to or withdrawn from the system. For example, a coolant may be circulated, where required, to maintain the temperature of preheating in the exchanger 79 below a safe maximum limit.

Pursuant *to* this arrangement, preheating of reactants occurs in the zone below inlet 81, the less stable reactant receiving its preheat in the lower section of the zone after predetermined cooling of the hot thermophore has been effected. Reaction is completed in the zone A, and thereabove the reaction product gases are cooled to any desired degree by exchange with the stream of thermophore, being withdrawn as at 85.

In the embodiment of Figure 5, reaction occurs in the vessel 86 just above distributing inlet 87 for the less stable reactant. The thermophore circulates downwardly and at the base of the vessel 86 is split into two streams by branch standpipes 88 and 89. Standpipe 88 passes directly into preheating vessel 90 whereas standpipe 89 discharges thru star feeder 91 into preheating vessel 92. The two preheating vessels in turn discharge thru standpipes 93 annd 94 and feeders 95 and 96 into the conveyor and elevating system 62 for return to the top of vessel 86 via standpipe 97 and feeder 98.

Methane, for instance, is supplied to preheating vessel 92 thru distributing inlet 99, passed upwardly thru the hot thermophore and, at the selected level of preheat, conducted to inlet 87 via the pipe 100. Oxygen, on the other hand, is concurrently fed into the lower portion of vessel 90 thru distributing inlet 101 and passes upwardly and successively thru that vessel, the standpipe 88 and the lower section of vessel 86.

Above the inlet 87 the two reactants meet and react in the zone A. The relatively more stable reactant, oxygen in the above illustration, is preheated by direct countercurrent exchange with the thermophore in the vessel 90, the standpipe 88 and the vessel 86, the last stage of preheating serving to cool the hot thermophore to any selected level suitable for contact with the reactant in vessel 92. Obviously by suitable relative proportioning of the thermophore streams in vessels 90 and 92, and by properly proportioning the lower preheating zone of vessel 86, the preheating in vessel 92 may be controlled within narrow limits. A heavy exchanger may be incorporated in the lower portion of vessel 86 if additional control is required.

While mention has been made of oxygen as one of the reactants, it is to be understood that this refers only to a preferred embodiment submitted for illustrative purposes. In place of oxygen, various oxygen-containing gases such as air may be supplied.

As is known, moreover, the oxygen compounds such as carbon dioxide and/or water vapor may be used in addition to oxygen. Frequently, as much as 20 or 30% of carbon dioxide and/or water vapor may be employed along with oxygen without lowering the reaction temperature below that required for optimum operation. The use of carbon dioxide or steam is of advantage in permitting adjustment of the relative proportions of hydrogen and carbon monoxide in the synthesis gas produced.

The invention is of advantage in obviating the normal detrimental effects of high temperature oxygen upon heat exchangers or other instrumentalities with which it comes in contact. Thus, it will be noted that, in accordance with the present invention, the high temperature oxygen contacts only relatively inert thermophore or the relatively inert refractory lining of the preheating vessel, and is discharged directly into the generator, but for the interconnecting pipes or conduits which may be adequately protected.

With reference to the temperatures of preheat, methane may normally be heated to temperatures as high as 900° F. without material decomposition. It will be apparent from the foregoing, that the invention, however, is applicable to other hydrocarbons each having, as is known, a characteristic limiting upper temperature above which thermal decomposition may be objectionable. The invention, therefore, contemplates the heating of each hydrocarbon to a temperature below the range of undesired thermal decomposition, and is therefore applicable to all of the gaseous hydrocarbons including ethane, ethylene, propane, butane, and the like. The invention, moreover, is adaptable to use with liquid hydrocarbons.

As a corollary to the foregoing, the rate of thermophore circulation should be so adjusted that the heat extracted by the oxygen or oxygen-containing gas is sufficient to reduce the thermophore temperature to the appropriate level required in the preheating of the hydrocarbon.

It is to be understood that many granular heat absorptive solid materials are suitable. Necessarily, this solid possesses refractory characteristics enabling it to maintain its discrete solid condition at temperatures which may desirably range above 1800° F. and as high as 3000° F. or thereabove. By way of example, suitable materials are magnesia, zirconia, thoria, alundum, carborundum, temperature resistant alloys and many others. So, also, it may be advantageous in many instances to substitute for the inert thermophore a catalyst for the reaction in question or to employ an inert thermophore having such a catalyst, as nickel, deposited thereon. The thermophore particles should be of a size such that they are easily handled in apparatus of the type contemplated. Furthermore, the particles should be of such size and shape that gases and vapors can flow up through a bed thereof without large pressure drops. Generally, it is advisable to employ fairly uniform-sized particles not smaller than, say, 40 mesh material. Preferably, particles of about 1/16 to 3/16 inch diameter are used, but other sizes are feasible.

It is advantageous to make synthesis gas in a system of the type depicted in Figure 2, since not only is the formation of carbon avoided in the preheating of methane but also the tendency to carbon production during the reaction is substantially eliminated by the omission of refractory packing within the reaction zone.

Where the synthesis gas is required for the production of hydrocarbons by contact with an iron-type catalyst at pressures of 200 to 250 lbs. per sq. in. gauge, it is advisable to operate the process of the present invention at the same elevated pressure to produce the synthesis gas.

Many other specific modifications and adaptations of the present invention will be obvious to those skilled in the art from a consideration of the foregoing more or less exemplary disclosure and it is therefore understood the invention is not limited to any such details except as defined by the following claims.

I claim:

1. In the high temperature manufacture of synthesis gas composed essentially of hydrogen and carbon monoxide by the reaction of reactants comprising a hydrocarbon and an oxygen-containing gas, the steps which comprise supplying said reactants to a reaction zone operating at reaction temperature, and in relative quantities operative for the production of a reaction product containing essentially carbon monoxide and hydrogen, transferring heat energy from the reaction zone to a mass of solid, granular heat carrier bodies, and continuously and individually preheating said reactants by separate passage in countercurrent heat exchange relationship to said mass of solid heat carrier bodies in such order that the oxygen-containing reactant initially meets said mass of solid heat carrier bodies and substantially lowers its temperature, and thereafter the hydrocarbon reactant is passed in heat exchange relationship and preheated to a relatively lower temperature.

*2. The method as defined in claim 1, wherein the reaction zone is an open, unpacked space which is free from granular packing and has a low ratio of internal surface to volume, said ratio being less than 1 when said surface and said volume are computed in terms of feet as the linear unit of measurement, whereby to inhibit the production of free carbon and wherein the transfer of heat energy from the reaction zone to the mass of heat carrier bodies is effected by withdrawing the reaction product from said reaction zone at high temperature and passing the same in contact with said mass of heat carrier bodies in a heat transfer zone separate from said reaction zone.*

*3*[2]. The method as defined in claim 1, wherein the solid heat carrier bodies leave the oxygen preheating zone at a temperature below about 1000° F. and wherein the hydrocarbon is thereafter preheated to a temperature below about 1000° F.

*4*[3]. In the high temperature manufacture of synthesis gas composed essentially of hydrogen and carbon monoxide by the reaction of reactants comprising a hydrocarbon and an oxygen-containing gas, the steps which comprise supplying said reactants to a reaction zone operating at reaction temperature, and in relative quantities operative for the production of a reaction product containing essentially carbon monoxide and hydrogen, transferring heat energy from the reaction zone to a mass of solid heat carrier bodies, and continuously and individually preheating said reactants by separate passage in heat exchange relationship to said solid heat carrier bodies in such order that the oxygen-containing gas initially meets the solid heat carrier bodies and substantially lowers their temperature, and thereafter the hydrocarbon reactant is passed in heat exchange relationship and preheated without substantial decomposition.

*5*[4]. In the high temperature manufacture of synthesis gas composed essentially of hydrogen and carbon monoxide by the reaction of reactants comprising a hydrocarbon and an oxygen-containing gas, the steps which comprise supplying said reactants to a reaction zone operating at reaction temperature, and in relative quantities operative for the production of a reaction product containing essentially carbon monoxide and hydrogen at said high temperature, transferring heat energy from said high temperature reaction product to a mass of solid heat carrier bodies to raise the temperature thereof, continually passing said hot solid heat carrier bodies through first and second preheating zones in succession and then returning them into heat transfer relationship with hot reaction product, and continually and individually preheating said reactants by separate passage in heat exchange relationship to said solid heat carrier bodies in such order that the oxygen-containing gas initially meets the solid heat carrier bodies in the first preheating zone and substantially lowers the temperature thereof, and thereafter, the hydrocarbon reactant is passed in heat exchange relationship in the succeeding preheating zone and preheated without substantial decomposition.

*6*[5]. The method according to claim *5*[4] wherein transfer of heat energy to the solid heat carrier bodies is effected within said reaction zone.

*7*[6]. The method according to claim *5*[4] wherein the transfer of heat energy from the hot reaction product to the solid heat carrier bodies is effected in a heat transfer zone separate from the reaction zone.

*8. The method according to claim 6 wherein the re-*

*action zone is an open, unpacked space which is free from granular packing and has a low ratio of internal surface to volume, said ratio being less than 1 when said surface and said volume are computed in terms of feet as the linear unit of measurement, whereby to inhibit the production of free carbon.*

*9*[7]. The method according to claim *5*[4] wherein said oxygen-containing gas is composed of high purity oxygen.

*10*[8]. In the high temperature manufacture of synthesis gas composed essentially of hydrogen and carbon monoxide by the reaction of reactants comprising a hydrocarbon and an oxygen-containing gas, the steps which comprise supplying said reactants to a reaction zone operating at reaction temperature, and in relative quantities operative for the production of a reaction product containing essentially carbon monoxide and hydrogen, continuously feeding a stream of solid heat carrier bodies to said reaction zone, transferring heat energy from the reaction zone to said solid heat carrier bodies to substantially raise the temperature thereof, withdrawing hot solid heat carrier bodies from the reaction zone, and continuously and individually preheating said reactants by separate passage in heat exchange relationship to said solid heat carrier bodies in such order that the oxygen-containing gas initially meets the heat carrier bodies and substantially lowers their temperature, and thereafter, the hydrocarbon reactant is passed in heat exchange relationship and preheated without substantial decomposition.

*11*[9]. In the high temperature exothermic reaction of reactants, comprising a heat-stable fluid and a relatively heat-unstable fluid, which react with the evolution of heat to form desired products of reaction, the steps which comprise supplying said reactants to a reaction zone operating at reaction temperature, and in relative quantities for production of the desired product, transferring heat energy from the reaction zone to a mass of solid heat carrier bodies, and continuously and individually preheating said reactants by separate passage in countercurrent heat exchange relationship to said solid heat carrier bodies in such order that the relatively heat-stable fluid initially meets the solid heat carrier bodies and substantially lowers their temperature, and thereafter, the relatively heat-unstable reactant is passed in heat exchange relationship and preheated without substantial decomposition.

*12. In the high temperature manufacture of synthesis gas composed essentially of hydrogen and carbon monoxide by the reaction of reactants comprising a hydrocarbon and an oxygen-containing gas, the steps which comprise separately preheating said reactants, supplying the preheated reactants to an open, unpacked reaction zone free from granular packing and having a low ratio of internal surface to volume, said ratio being less than 1 when said surface and said volume are computed in terms of feet as the linear unit of measurement, whereby to inhibit the production of free carbon, said preheated reactants being supplied in relative quantities operative for the production of a reaction product containing essentially carbon monoxide and hydrogen, and maintaining said reaction zone at a temperature of at least 2100° F. and a pressure of a least 200 lbs. per sq. in. gauge.*

*13. The method according to claim 12 wherein the hydrocarbon is natural gas and the oxygen-containing gas is high purity oxygen.*

References Cited in the file of this patent or the original patent

UNITED STATES PATENTS

| | | |
|---|---|---|
| 1,738,890 | Goodrich | Dec. 10, 1929 |
| 1,904,153 | Lucke | Apr. 18, 1933 |
| 1,966,610 | Chilowsky | July 17, 1934 |
| 2,399,450 | Ramseyer | Apr. 30, 1946 |
| 2,582,938 | Eastman et al. | Jan. 15, 1952 |

11 12

UNITED STATES PATENT OFFICE

CERTIFICATE OF CORRECTION

Reissue No. 24,148 May 8, 1956

Paul W. Garbo

It is hereby certified that error appears in the printed specification of the above numbered patent requiring correction and that the said Letters Patent should read as corrected below.

Column 8, line 75, for the claim reference numeral "6" in italics read — 7 — in italics.

Signed and sealed this 26th day of June 1956.

(SEAL)
Attest:

KARL H. AXLINE
Attesting Officer

ROBERT C. WATSON
Commissioner of Patents